United States Patent
Al-Salameh

(10) Patent No.: US 6,262,820 B1
(45) Date of Patent: Jul. 17, 2001

(54) OPTICAL TRANSMISSION SYSTEM INCLUDING OPTICAL RESTORATION

(75) Inventor: Daniel Y. Al-Salameh, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/115,558

(22) Filed: Jul. 15, 1998

(51) Int. Cl.[7] ................................................. H04B 10/24
(52) U.S. Cl. ........................ 359/119; 359/119; 359/110; 359/117; 359/161; 370/217; 370/216; 370/222; 370/223; 370/224
(58) Field of Search ..................................... 359/110, 117, 359/119, 161; 370/222, 223, 224, 88, 217, 216

(56) References Cited

U.S. PATENT DOCUMENTS

| | | | |
|---|---|---|---|
| 5,493,569 | * | 2/1996 | Buchholz et al. .................... 370/442 |
| 5,657,320 | * | 8/1997 | Russ et al. ............................ 370/217 |
| 5,838,924 | * | 11/1998 | Anderson et al. .................... 709/239 |
| 5,903,370 | * | 5/1999 | Johnson ............................... 395/119 |
| 5,986,783 | * | 11/1999 | Sharma et al. ....................... 359/119 |
| 6,046,833 | * | 4/2000 | Sharma et al. ....................... 359/119 |
| 6,088,141 | * | 7/2000 | Merli et al. .......................... 359/110 |
| 6,111,672 | * | 8/2000 | Davis et al. .......................... 359/110 |

* cited by examiner

*Primary Examiner*—Jason Chan
*Assistant Examiner*—Chau M. Nguyen

(57) ABSTRACT

An optical communications system employs a plurality of optical nodes interconnected in an optical ring transmission configuration by at least two optical transmission media, for example, optical fiber. The at least two optical transmission media, in this example, provide optical service transmission capacity and optical protection transmission capacity. Efficient restoration of optical communications between optical nodes in the optical ring transmission configuration, after an optical transmission media failure, is realized by employing an autonomous optical restoration arrangement and technique. To this end, each node autonomously controls an optical switch matrix in the node in effecting the desired restoration without the need of switch control signals transmitted from any other node in the ring, from a main controller or from a central controller.

10 Claims, 12 Drawing Sheets

101

OPTICAL TRANSMISSION SYSTEM INCLUDING OPTICAL RESTORATION

RELATED APPLICATION

U.S. patent application Ser. No. 09/067,233 was filed on Apr. 27, 1998.

TECHNICAL FIELD

This invention relates to restoration of transmission systems and, more particularly, to restoration of optical transmission systems.

BACKGROUND OF THE INVENTION

Optical transmission systems and, especially, those employing Dense Wavelength Division Multiplexing (DWDM) are desirable because they provide extremely wide bandwidths for communications channels. Each communications channel in the DWDM transmission system carries a plurality, for example, 16, 40 or even 80, optical channels (wavelengths) on a single optical fiber and single optical repeater. However, there is a trade off between providing wider bandwidth communications channels, with their corresponding lower cost of transport, and their vulnerability to large-scale disruption of communications services because of transmission medium failure. Therefore, the ability of an optical transmission system, for example, those employing DWDM, to restore itself after a transmission medium failure is very important because of its wider impact on communications services. The DWDM optical transmission systems are of particular interest because of their restoration capabilities.

Prior attempts at providing adequate restoration in optical transmission systems have focused on so-called 1+1 optical protection switching and on optical cross connect systems. The 1+1 optical protection switching is limited in its application and does not efficiently use optical fiber. Known optical cross connect systems, require the use of a relatively large optical switching fabric to accommodate the capacity of the optical transmission system. Unfortunately, current technology may not support providing such a large switching fabric having an acceptable optical performance level. Moreover, use of such a large switching fabric in the optical cross connect comes with a relatively high cost. Furthermore, the optical cross connect system will be slower in terms of restoration speed than provided by prior known SONET/SDH ring transmission systems. In order to protect all wavelengths used in the optical transmission system the prior arrangements had to switch one wavelength at a time. Such switching is very inefficient.

More recently, an optical restoration system has been proposed in which efficient restoration of optical communications between optical nodes in the ring, after an optical transmission media failure, is realized by employing a relatively simple and efficient optical switch matrix having a first number of possible switching states and, then, by utilizing only a second number of the switching states fewer than the first number to switch optically from the optical service transmission capacity of the failed or faulted optical transmission media to the optical protection transmission capacity of another optical transmission media. Optical switching states of the optical switch matrix are blocked that are not actively used for switching from the active optical service capacity of the faulted optical transmission media to the standby optical protection capacity of the other optical transmission media. Use of this relatively simple optical switch matrix allows for the bulk switching of the optical wavelengths as contrasted with the one-to-one switching of the optical wavelengths used in prior arrangements. However, switch control signals must be transmitted via a maintenance channel to effect proper switching in other nodes in the optical ring transmission system.

SUMMARY OF THE INVENTION

These problems and other limitations of prior known optical restoration systems are overcome in an optical communications system that employs a plurality of optical nodes interconnected in an optical ring transmission configuration by at least two optical transmission media, for example, optical fiber. The at least two optical transmission media, in this example, provide optical service transmission capacity and optical protection transmission capacity. Efficient restoration of optical communications between optical nodes in the optical ring transmission configuration, after an optical transmission media failure, is realized by employing an autonomous optical restoration arrangement and technique. To this end, each node autonomously controls an optical switch matrix in the node in effecting the desired restoration without the need of switch control signals transmitted from any other node in the ring, from a main controller or from a central controller.

Specifically, each optical node in the optical ring transmission configuration has the capability to detect the presence or absence of optical signals at its input optical ports. Upon detecting a loss of optical signal on an incoming service capacity port, the node autonomously switches its optical switch matrix configuration to route a copy of its outgoing optical signal in a direction away from the fault. Then, upon detecting the presence of an optical signal on an incoming protection capacity port, the node autonomously switches its optical switch matrix configuration to supply the optical signal incoming on the protection capacity port to terminal equipment associated with the node. Additionally, each node has the capability of detecting a change of signal state at its protection capacity input ports. Upon a change from no signal to detection of an optical signal at a protection capacity input port, the node autonomously switches the switch matrix to pass the detected optical signal through to a protection capacity output port.

A technical advantage of the invention is that through the autonomous switching of the node optical switch matrix, transitions between switching states are faster, thereby resulting in faster overall restoration in the optical ring transmission configuration. Furthermore, restoration is still effected even if the node main controller is out of service for maintenance or otherwise.

DETAILED DESCRIPTION

Figure 1:
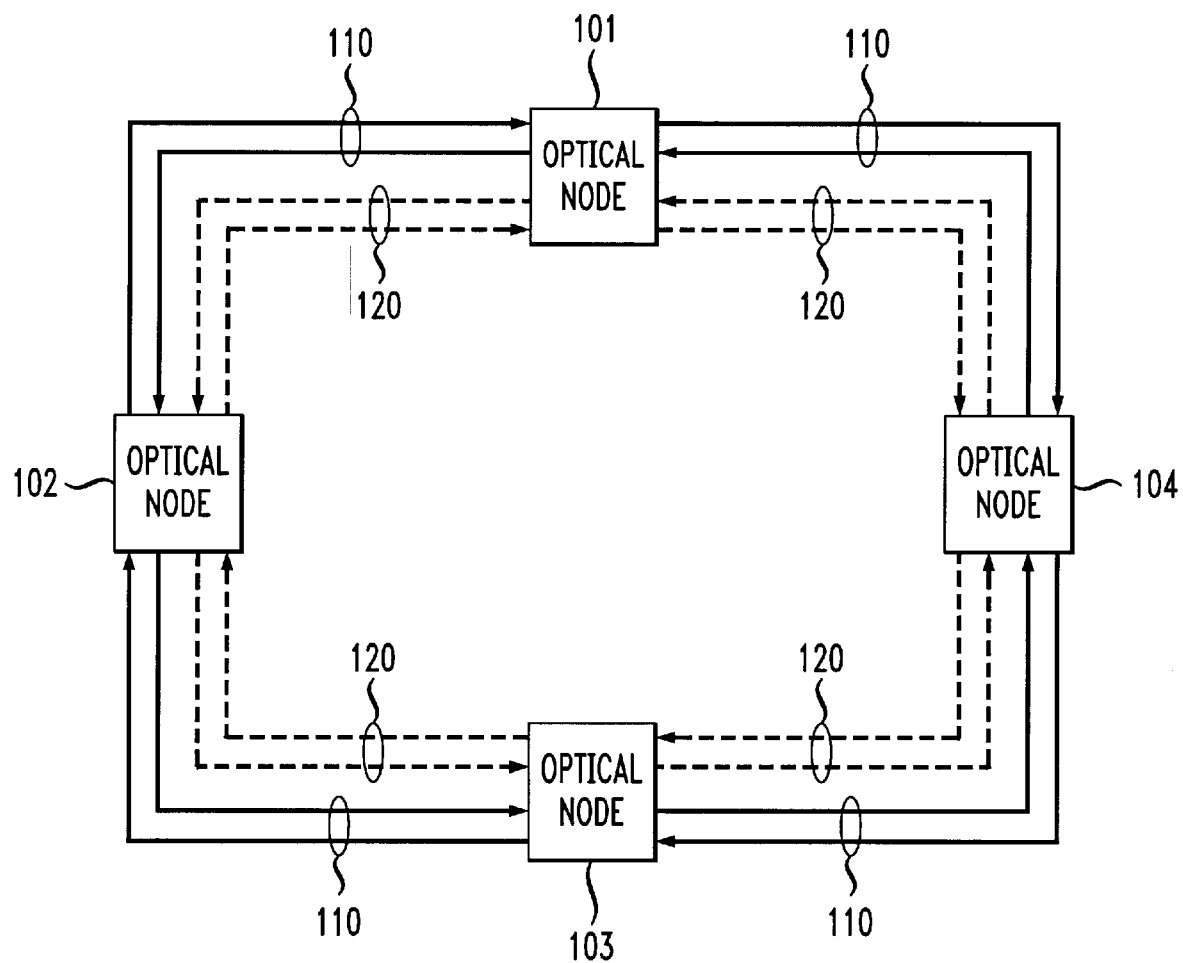
FIG. 1 illustrates, in simplified block form, details of an optical ring transmission system.

FIG. 1 shows, in simplified form, bi-directional optical transmission system 100, which connected in a ring configuration. For brevity and clarity of exposition optical transmission system 100 is shown as including only optical nodes 101 through 104, each incorporating an embodiment of the invention. Optical nodes 101 through 104 are interconnected by bi-directional optical transmission media 110, which for brevity and clarity of exposition, in this example, transport active service transmission capacity and by bi-directional optical transmission media 120, which also for brevity and clarity of exposition, in this example transports standby protection transmission capacity. In this example, optical transmission medium 110 and 120 are comprised of optical fibers and each could be comprised of a single optical fiber or two (2) optical fibers. That is, bi-directional optical transmission system 100 could be either a two (2) optical fiber or a four (4) optical fiber system. In a preferred embodiment of the invention, two (2) optical fibers are employed, each of the optical fibers ideally including 30% service bandwidth and 30% protection bandwidth. In an alternative embodiment of the invention, one of the two (2) optical fibers can carry active service transmission capacity and the other optical fiber can carry standby protection transmission capacity. In a four (4) optical fiber system, separate optical fibers are employed to transport active service transmission capacity in both directions of transmission, and separate optical fiber are employed to transport standby protection transmission capacity in both directions of transmission. The optical transmission system 100 could transport, for example, 8, 16, 32, 40, 80, etc. communications channels, i.e., wavelengths. It should be noted that in either the two (2) optical fiber arrangement or the four (4) optical fiber arrangement a separate so-called telemetry channel is employed as a maintenance channel, in addition to the communications channels. Thus, in an eight (8) channel system, nine (9) channels are transported, in a 16 channel system, 17 channels are transported and so on. The maintenance channel transports, among other things, the switching information for configuring optical nodes 101 through 104 in optical transmission system 100. Use of the maintenance channel in transporting protection switching information in order to restore transmission in optical transmission system 100 in response to a transmission media failure or the like is described below. Two (2) and four (4) optical fiber transmission systems are known.

Figure 2:
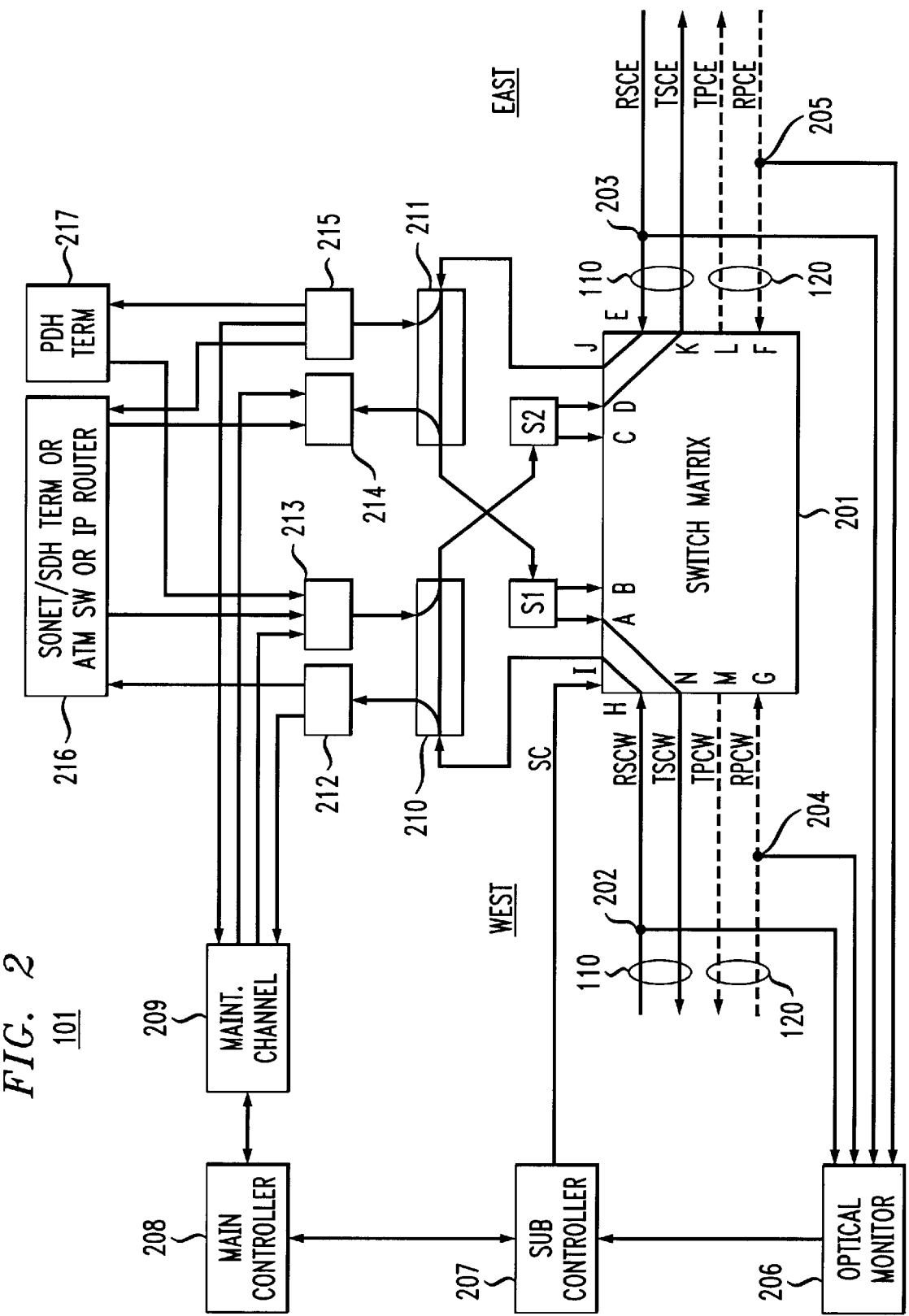
FIG. 2 illustrates, in simplified block diagram form, details of an optical node used in the system of FIG. 1 and including an embodiment of the invention.

FIG. 2 shows, in simplified block diagram form, details of optical nodes 101–104, including an embodiment of the invention and operating in a normal transport mode. That is, there is no optical transmission media failure or other disruption of transmission service. Again, for brevity and clarity of exposition, the bi-directional active service transmission capacity is shown as being transported on optical transmission media 110 and the standby protection transmission capacity is shown as being transported on optical transmission media 120. As indicated above, in a preferred embodiment of the invention, each of at least two optical fibers transports both active service transmission capacity and standby protection transmission capacity. Shown is optical receive service capacity from the west (RSCW) being supplied to input H of applicants' unique optical switch matrix 201, optical transmit service capacity to the west (TSCW) being supplied from output N of optical switch matrix 201, optical transmit protection capacity to the west (TPCW) being supplied from output M of optical switch matrix 201, and optical receive protection capacity from the west (RPCW) being supplied to input G of optical switch matrix 201. Similarly, on the east side of optical node 101, optical receive service capacity (RSCE), is supplied to input E, optical transmit service capacity (TSCE) is supplied from output K, optical receive protection capacity (RPCE) is supplied to input F and optical transmit protection capacity (TPCE) is supplied from output L, all to/from optical switch matrix 201. RSCW supplied to input H is supplied via optical switch matrix 201 to output I and, thereafter, to optical add/drop multiplexer 210. Similarly, RSCE supplied to input E is supplied via optical switch matrix 201 to output J and, thereafter, to optical add/drop multiplexer 211. TSCW from optical add/drop multiplexer 211 is supplied to optical splitter S1, which forms two versions of it. One version of TSCW is supplied to input A and, thereafter, to output N of optical switch matrix 201, while the other version of TSCW is supplied to input B for use if a protection switch is required. Similarly, TSCE from optical add/drop multiplexer 210 is supplied to optical splitter S2, which forms two versions of it. One version of TSCE is supplied to input D and, thereafter, to output K of optical switch matrix 201, while the other version of TSCW is supplied to input C for use if a protection switch is required. Control signals (SC) for controlling operation of optical switch matrix 201 are supplied from sub-controller 207. Details of optical switch matrix 201 and its operation are described below.

A relatively small portion of optical energy (for example, less than 2%) being transported via each of RSCW, RPCE, RPCW and RPCE is coupled via optical taps 202, 203, 204 and 205, respectively, to optical monitor 206. Optical monitor 206 detects the presence or absence of optical signals on any of the optical transports supplying optical signals to optical node 101 and, therein, to optical switch matrix 201. Additionally, it is noted that optical monitor 206 generates indications of the presence or absence of an optical signal at the input ports of optical switch matrix 201. Details of optical monitor 206 are described below in relationship to FIG. 12. Any LOS information and indications of the presence of optical signals at the optical switch matrix input ports are supplied from optical monitor 206 to sub-controller 207, which supplies switch control (SC) signals to optical switch matrix 201 for initiating and effecting any required protection switch to effect optical restoration. It is emphasized that the switching of the optical switch matrix states is effected autonomously by each node in the optical ring configuration without the need of switch indication signals being transmitted in the maintenance channel as was required in prior known arrangements. Main controller 208 supplies switch information, among others, to maintenance channel unit 209. Maintenance channel unit 209 supplies maintenance information via the maintenance channel to optical combining units 213 and 214 where it is combined with other optical channels (if any) to be added via add/drop multiplexers 210 and 211 to TSCW and TSCE to transported to others of optical nodes 102 through 104 for use as desired at those optical nodes. Note if a protection switch is made, then, the maintenance channel is transported as appropriate via TPCW and/or TPCE. Incoming maintenance channel information is supplied from RSCW and RSCE and if a protection switch has been made from RPCW and/or RPCE as appropriate, where it is dropped via add/drop multiplexers 210 and 211 to optical splitters 212 and 215, respectively. Optical maintenance channel information is supplied from optical splitters 212 and 215 to maintenance channel unit 209 and, thereafter, to main controller 208. Optical communications channels dropped by add/drop multiplexers 210 and 211 are also supplied to optical splitters 212 and 215, respectively. Optical communications channel information from optical splitters 212 and 215 is supplied to optical terminal equipment 216 as desired. Terminal equipment 216 may include, for example, a synchronous optical network/ synchronous digital hierarchy (SONET/SDH) terminal, or an asynchronous transfer mode (ATM) switch, or an internet protocol (IP) router, or the like. Additionally, optical communications channel information from optical splitter 215 is supplied to peizosynchronous digital hierarchy (PDH) terminal 217. Communications channel information from terminal equipment 216 is supplied to be added for transport to optical combining units 213 and 214 and, thereafter, to add/drop multiplexers 210 and 211. Optical communications channel information from peizosynchronous digital hierarchy (PDH) terminal 217 is supplied to optical combining unit 213 and, thereafter, to add/drop multiplexer 210 to be added to TSCE and/or TPSE. Note that the peizosynchronous digital hierarchy (PDH) communications information from terminal 217 is span related and, therefore, is only supplied, in this example, to TSCE and/or TPCE. One example of terminal equipment that may be associated with a node has been described. It will be apparent that other or addition terminal equipment mat also be associated with a node.

Figure 3:
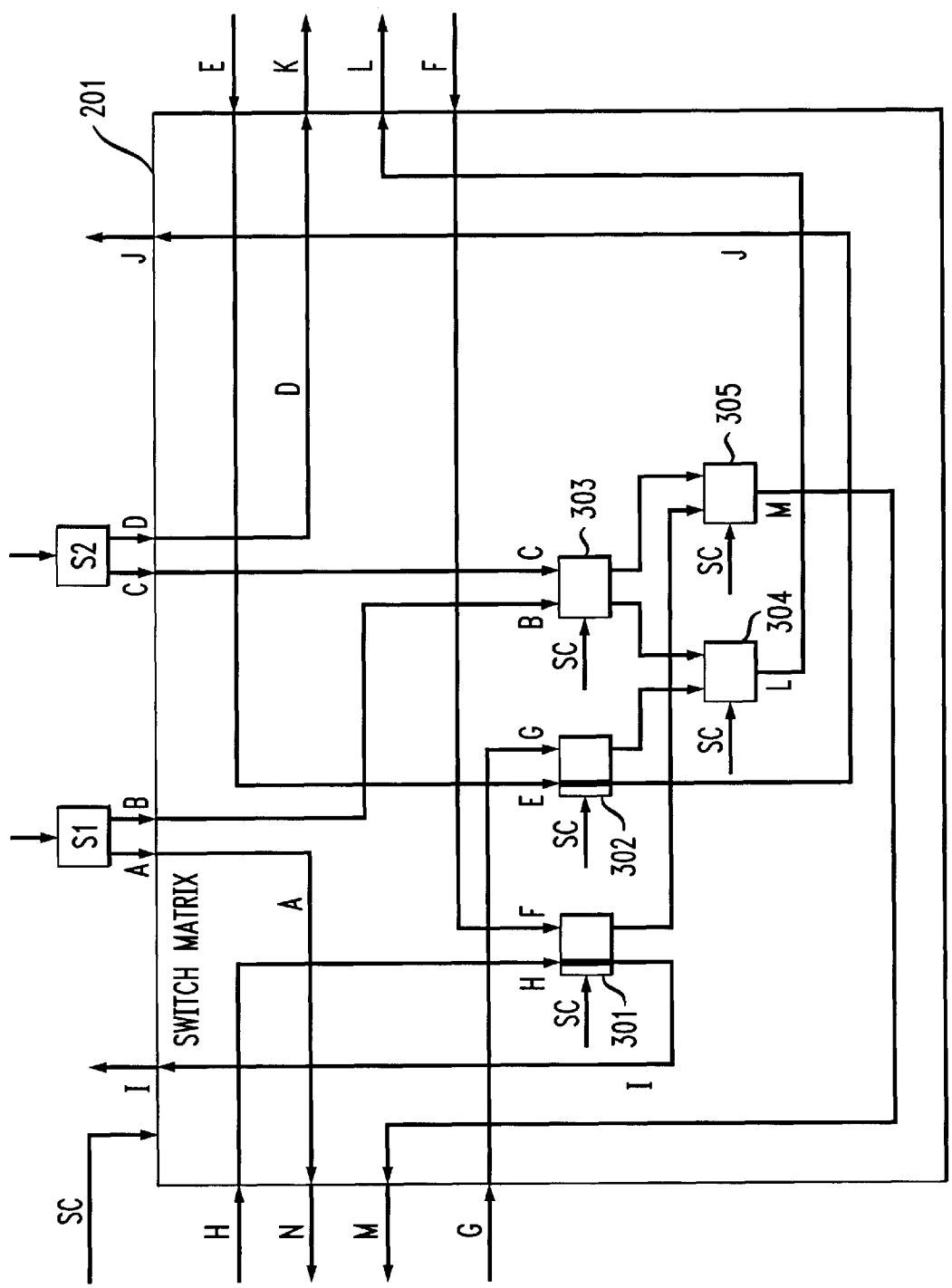
FIG. 3 illustrates, in simplified block diagram form, details of a unique optical switch matrix employed in a node including an embodiment of the invention and configured for normal optical service transmission.

FIG. 3 illustrates, in simplified block diagram form, details of applicants' unique optical switch matrix, e.g., optical switch matrix 201, employed in an embodiment of the invention. Note that in this example, inputs A through H and outputs I through N of optical switch matrix 201 are optical. Shown in FIG. 3 are optical splitter S1 dual feeding optical communications channels normally intended for west bound transmission to inputs A and B of optical switch matrix 201, and optical splitter S2 dual feeding optical communications channels normally intended for east bound transmission to inputs C and D of optical switch matrix 201. In this example, it is noted that input A is connected directly to output N in the west bound direction, and that input D is connected directly to output K in the east bound direction. Of course, these "direct" connections can be made in any of a number of ways, for example, they can be made by assigning optical switch units to effect the desired connections at system setup, or dynamically in response to control signals These "direct" connections significantly simplify optical switch matrix 201 and make it significantly more efficient. Optical switch matrix 201 is further comprised of controllable optical switches 301 through 305. Optical switches 301 through 305 are controlled via switch control (SC) signals from sub-controller 207 (FIG. 2) to effect the bulk switching of optical signals including communications channels being supplied to them. This bulk optical switching is an important feature of applicants' unique optical switch matrix because it more efficiently effects switching of the optical signals. Again, note that switching with prior known arrangements was on an optical channel-by-optical channel basis, which is significantly less efficient than applicants' use of bulk switching. It should be further noted that although optical switch matrix 201 has eight (8) inputs and six (6) outputs, only 10 switching states are allowed of which two (2) switching states are designated by preassigning the optical input and optical output connections. This preassignment of two of the optical switch states may be realized in a number of ways, for example, permanent optical connections, optical switches always switched to those optical switch states, optical switches dynamically switched to the desired states, or the like. Thus, there are effectively only eight (8) allowable switching states of optical switch matrix 201, which significantly reduces the complexity of the switching of the optical signals and allows the use of relatively simple switching elements that are readily available. Indeed, no large complex switching matrix is required as would be in an optical channel-by-optical channel switching arrangement or in an optical cross connect switch. Further note that two (2) of the allowable optical switching states of optical switch matrix 201 are employed only in pass through optical nodes.

The controllable switching states of simplified optical switch matrix 201 are realized by employing controllable optical switching units 301 through 305. To this end, inputs H and F are supplied to individual inputs of optical switching unit 301. Inputs E and G are supplied to individual inputs of optical switching unit 302. Inputs B and C are supplied to individual inputs of optical switching unit 303. One output of optical switching unit 301 is supplied to optical output I. Therefore, an optical signal supplied via either input H or input F can be controllably supplied to output I via optical switching unit 301, in response to control signals SC. One output of optical switching unit 302 is supplied to optical output J. Consequently, an optical signal supplied via either input E or input G can be controllably supplied to output J via optical switching unit 302, in response to control signals SC. Another output from optical switching unit 301 is supplied to one input of optical switching unit 305, and an output from optical switching unit 303 is supplied to another input of optical switching unit 305. Then, an optical signal supplied via either input C or input F can be controllably supplied to output M via optical switching units 305, 301 and 303, in response to control signals SC. Another output from optical switching unit 302 is supplied to one input of optical switching unit 304, and another output from optical switching unit 303 is supplied to another input of optical switching unit 304. Thus, an optical signal supplied via either input B or input G can be controllably supplied to output L via optical switching units 304, 302 and 303, in response to control signals SC.

FIG. 3 illustrates the switching states of optical switch matrix 201 for "normal optical service transmission capacity transmission of optical signals. To this end, input H supplied to one input of switch unit 301 is supplied by an output to output I and input E supplied to one input of switching unit 302 is supplied by an output to output J. As indicated above, input A is directly connected to output N and input D is directly connected to output K.

Figure 4:
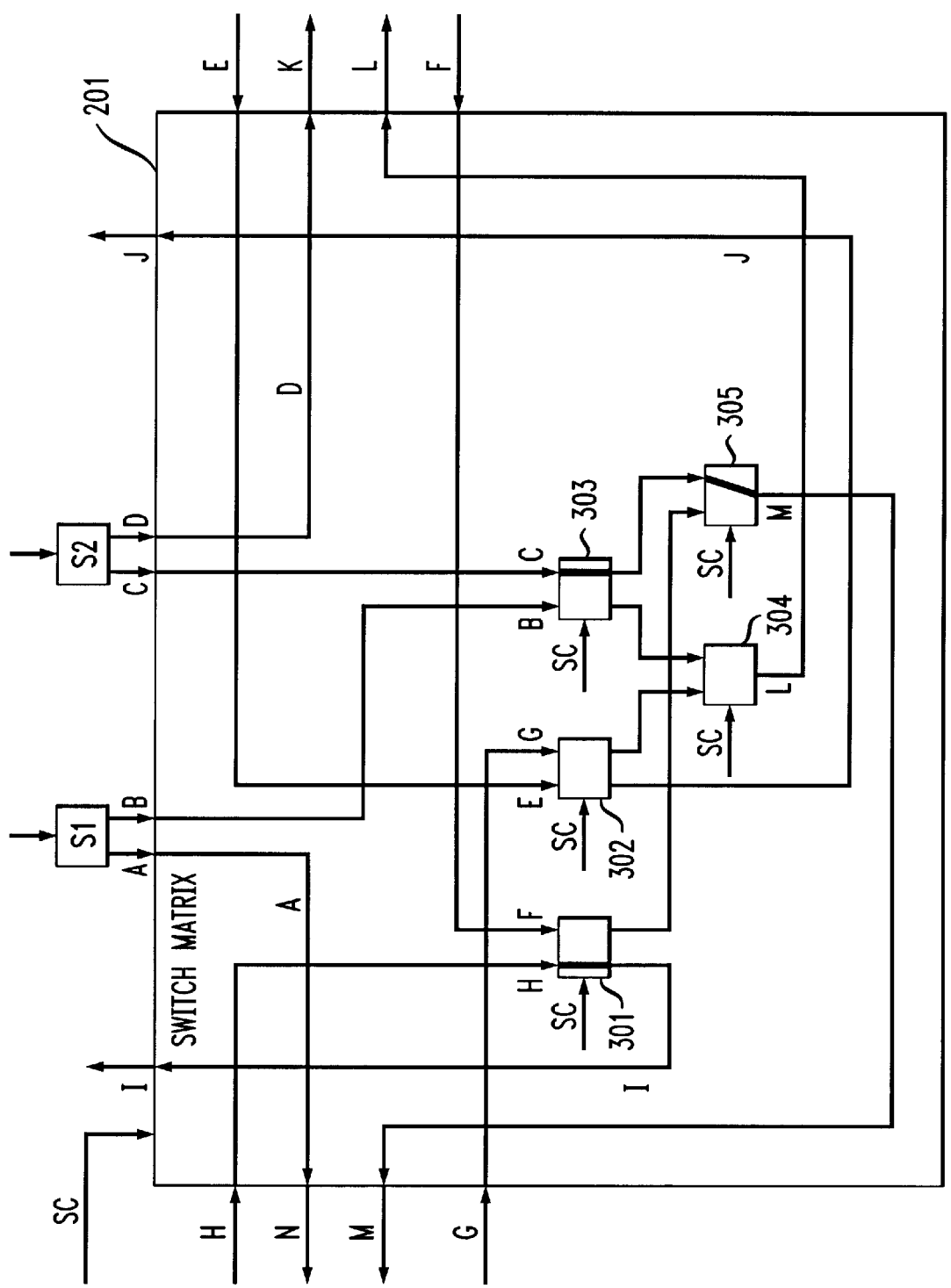
FIG. 4 illustrates, in simplified block diagram form, details of a unique optical switch matrix employed in a node including an embodiment of the invention and configured for initiating restoration from a loss of signal on the east side of the node.

FIG. 4 illustrates, in simplified block diagram form, details of a unique optical switch matrix employed in a node including an embodiment of the invention and configured for initiating restoration from a loss of signal on the east side of the node. The optical switch matrix 201 shown in FIG. 4 is identical in structure and operation as that shown in FIG. 3. The elements of the switch matrix shown in FIG. 4 have been similarly numbered as the identical elements shown in FIG. 3 and will not be discussed in detail. Specifically, in response to detection of loss of optical signal from the east, i.e., no signal (noise) detected on optical input E, restoration is initiated by switch matrix 201 in response to switch control (SC) signals causing optical switch unit 302 to disconnect input E from output J and causing optical switch units 303 and 305 to connect input C to output M. Input H continues to be connected via switch unit 301 to output I. Functionally, this operation of switch matrix 201 causes a copy of the optical signal that normally is supplied to output K of the optical service transmission capacity (fiber) to be sent in a direction away, i.e., to the west, from the transmission media or optical amplifier failure causing the loss of signal via output M on the optical protection transmission capacity. Thus, the connections effected in switch matrix 201 to initiate restoration from a failure to the east of the node are input H remains connected via switch unit 301 to output I, input A is still physically connected to output N, input C is connected via switch units 303 and 305 to output M and input D remains physically connected to output K. It is noted that the above connections made by switch units 301, 302, 303 and 305 are in response to switch control (SC) signals entirely generated in the node and, thus, are autonomously made in the node.

Figure 5:
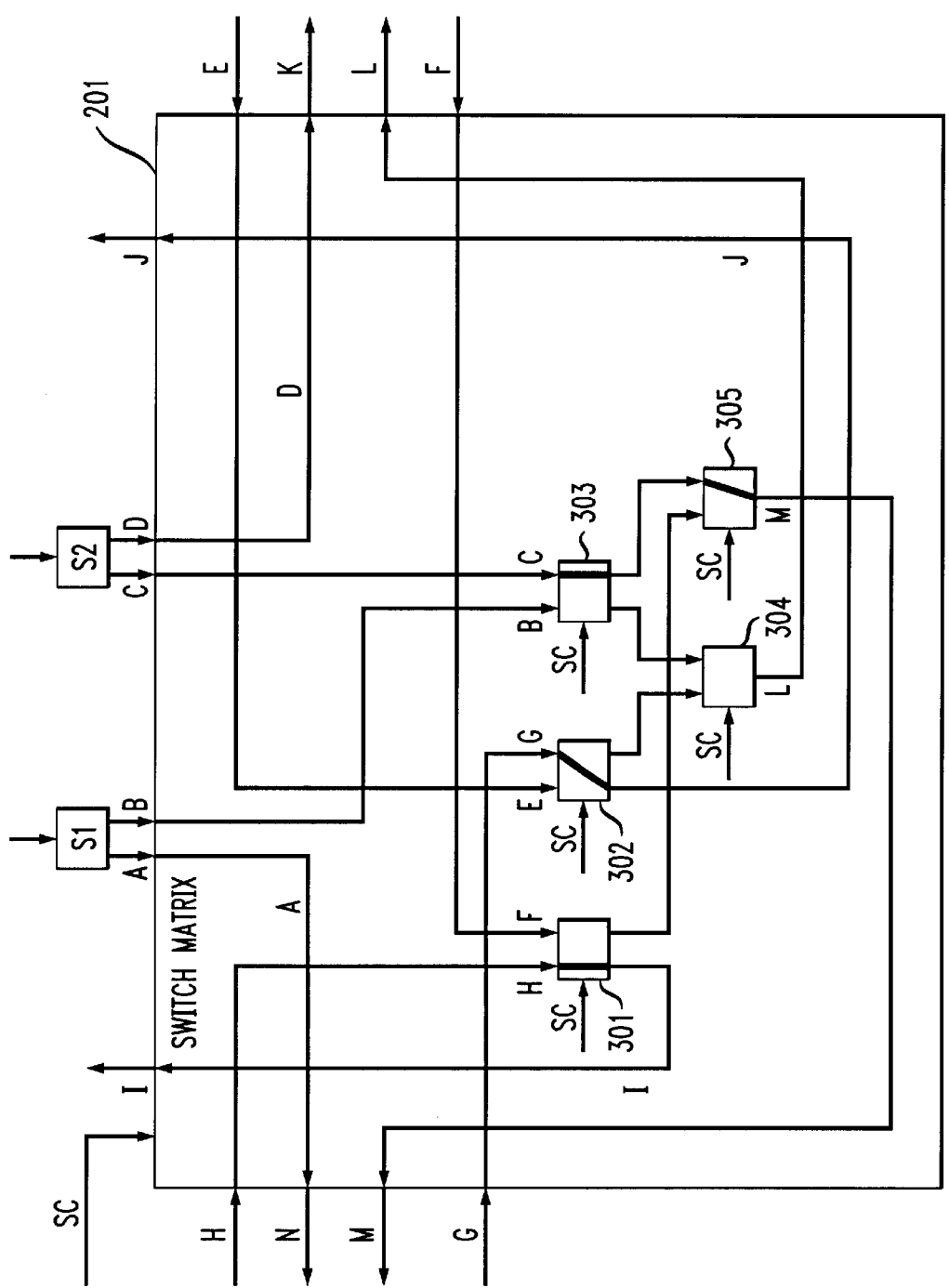
FIG. 5 illustrates, in simplified block diagram form, details of a unique optical switch matrix employed in a node including an embodiment of the invention and configured to effect restoration from a loss of signal on the east side of the node.

FIG. 5 illustrates, in simplified block diagram form, details of a unique optical switch matrix employed in a node including an embodiment of the invention and configured to effect restoration from a loss of signal on the east side of the node. The optical switch matrix 201 shown in FIG. 5 is also identical in structure and operation as that shown in FIG. 3. The elements of the switch matrix shown in FIG. 5 have been similarly numbered as the identical elements shown in FIG. 3 and will not be discussed in detail. Indeed, the connections effected by switch units 301, 303, 304 and 305 as shown in FIG. 5 are identical to those shown in FIG. 4. The only difference is the connection effected by switch unit 302 in response to switch control (SC) signals to connect input G of the incoming optical protection transmission capacity (fiber) to output J. This connection is effected in response to detection in the node via optical monitor 206 (FIG. 2) of reception of an optical signal on input G and completes the restoration in the node from the failure to the east.

Therefore, it is seen from the operation of switch matrix 201, as shown in FIGS. 4 and 5, in response to switch control (SC) signals generated entirely in the node, that the node autonomously causes the necessary switch connections to be made to effect restoration in that node. Thus, there is no need for switch control signals to be supplied from another node or from a central controller.

Figure 6:
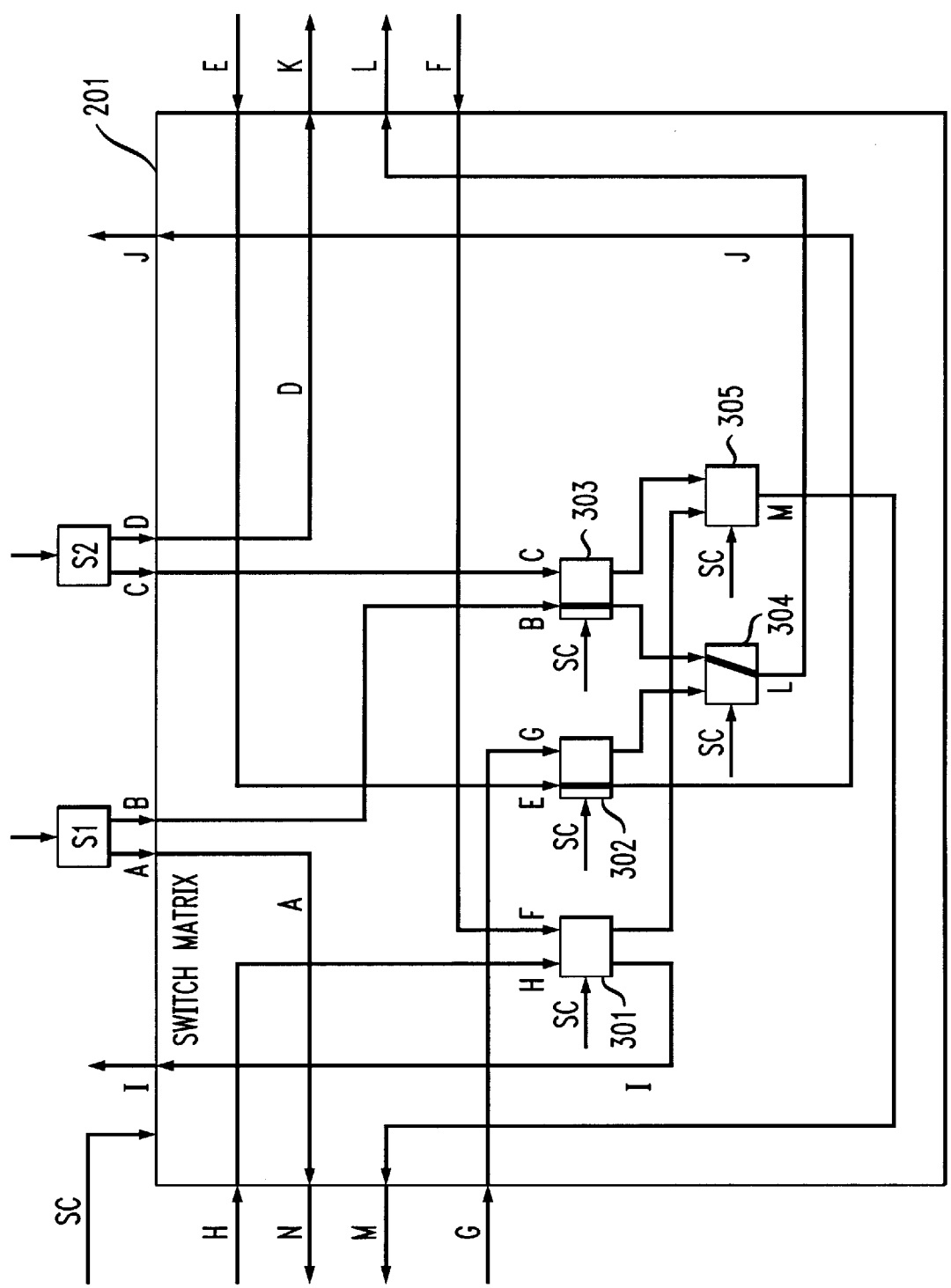
FIG. 6 illustrates, in simplified block diagram form, details of a unique optical switch matrix employed in a node including an embodiment of the invention and configured for initiating restoration from a loss of signal on the west side of the node.

FIG. 6 illustrates, in simplified block diagram form, details of a unique optical switch matrix employed in a node including an embodiment of the invention and configured for initiating restoration from a loss of signal on the west side of the node. The optical switch matrix 201 shown in FIG. 6 is identical in structure and operation as that shown in FIG. 3. The elements of the switch matrix shown in FIG. 6 have been similarly numbered as the identical elements shown in FIG. 3 and will not be discussed in detail. Specifically, in response to detection of loss of optical signal from the west, i.e., no signal (noise) detected on optical input H, restoration is initiated by switch matrix 201 in response to switch control (SC) signals causing optical switch unit 301 to disconnect input H from output I and causing optical switch units 303 and 304 to connect input B to output L. Input E continues to be connected via switch unit 302 to input J. Functionally, this operation of switch matrix 201 causes a copy of the optical signal that normally is supplied to output N of the optical service transmission capacity (fiber) to be sent in a direction away, i.e., to the east, from the transmission media or optical amplifier failure to the west causing the loss of signal via output L on the optical protection transmission capacity. Thus, the connections effected in switch matrix 201 to initiate restoration from a failure to the west of the node are input E remains connected via switch unit 302 to output J, input A is still physically connected to output N, input B is connected via switch units 303 and 304 to output L and input D remains physically connected to output K. It is noted that the above connections made by switch units 301, 302, 303 and 304 are in response to switch control (SC) signals entirely generated in the node and, thus, are autonomously made in the node.

Figure 7:
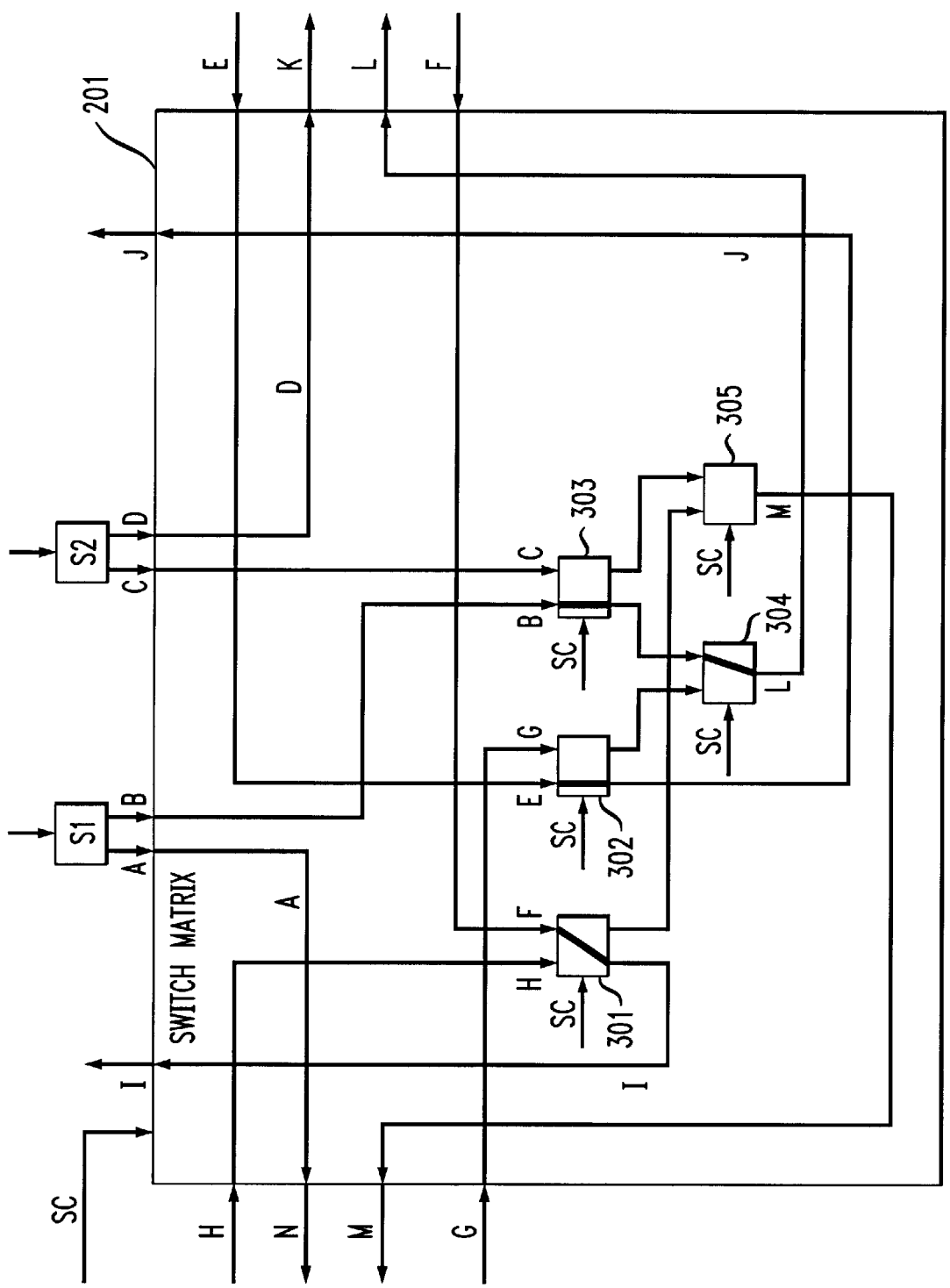
FIG. 7 illustrates, in simplified block diagram form, details of a unique optical switch matrix employed in a node including an embodiment of the invention and configured to effect restoration from a loss of signal on the west side of the node.

FIG. 7 illustrates, in simplified block diagram form, details of a unique optical switch matrix employed in a node including an embodiment of the invention and configured to effect restoration from a loss of signal on the west side of the node. The optical switch matrix 201 shown in FIG. 7 is also identical in structure and operation as that shown in FIG. 3. The elements of the switch matrix shown in FIG. 7 have been similarly numbered as the identical elements shown in FIG. 3 and will not be discussed in detail. Indeed, the connections effected by switch units 301, 302, 303 and 304 as shown in FIG. 7 are identical to those shown in FIG. 6. The only difference is the connection effected by switch unit 301 in response to switch control (SC) signals to connect input F of the incoming optical protection transmission capacity (fiber) to output I. This connection is effected in response to detection in the node via optical monitor 206 (FIG. 2) of reception of an optical signal on input F and completes the restoration in the node from the failure to the west.

Therefore, it is seen from the operation of switch matrix 201, as shown in FIGS. 6 and 7, in response to switch control (SC) signals generated entirely in the node, that the node autonomously causes the necessary switch connections to be made to effect restoration in that node. Thus, there is no need for switch control signals to be supplied from another node or from a central controller.

Figure 8:
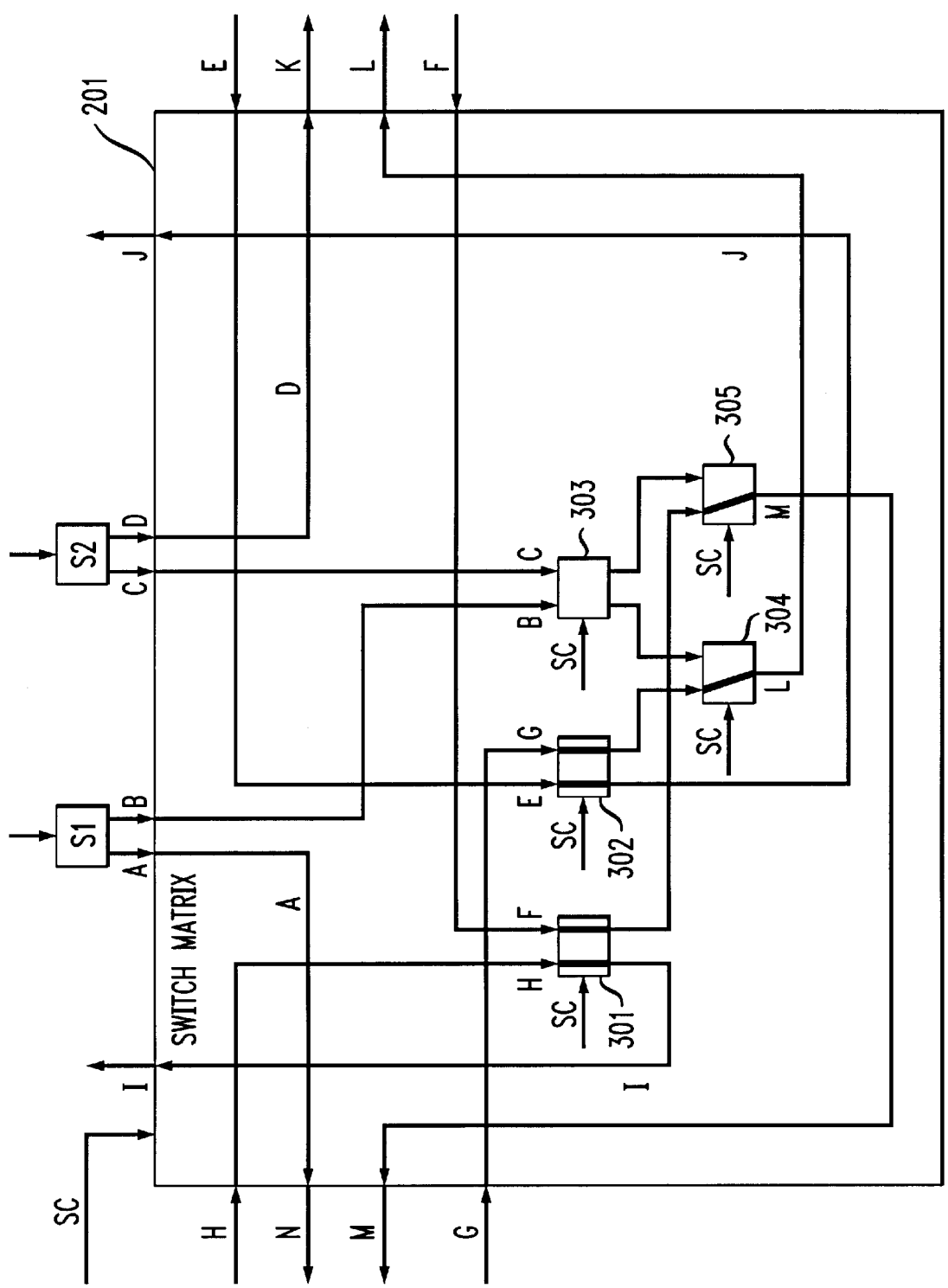
FIG. 8 illustrates, in simplified block diagram form, details of a unique optical switch matrix employed in a node including an embodiment of the invention and configured to effect restoration by passing optical through the node received on the optical protection transmission capacity.

FIG. 8 illustrates, in simplified block diagram form, details of a unique optical switch matrix employed in a node including an embodiment of the invention and configured to effect restoration by passing optical through the node received on the optical protection transmission capacity. The optical switch matrix 201 shown in FIG. 8 is also identical in structure and operation as that shown in FIG. 3. The elements of the switch matrix shown in FIG. 8 have been similarly numbered as the identical elements shown in FIG. 3 and will not be discussed in detail. Indeed, the connections effected by switch units 301 and 302 are to connect input H to output I and input E to output J. Input A remains physically connected to output N and input D remains physically connected to output K. These connections are identical to those shown in FIG. 3 and provide the normal optical service transmission capacity for the pass through node. In order to pass the optical signals to restore operation of the optical ring transmission configuration additional switch connections nee to be effected in the pass through node. To this end, switch matrix 201 is responsive to switch control (SC) signals generated entirely in the pass through node and in response to detection in the node via optical monitor 206 (FIG. 2) of reception of an optical signal on input F and/or input G of the optical protection transmission capacity (fiber) to make appropriate pass through connections. In this example, these pass through connections are that switch unit 301 additionally connects input F to an input of switch unit 305 and that switch unit 302 additionally connects input G to an input of switch unit 304. In turn, switch unit 305 completes the connection of input F to output M and that switch unit 301 and switch unit 304 completes the connection of input G to output L. Again, these pass through connections made to the optical protection transmission capacity are autonomously made in the pass through node without the need for switch control signals or messages being supplied from some other node or central controller.

Figure 9:
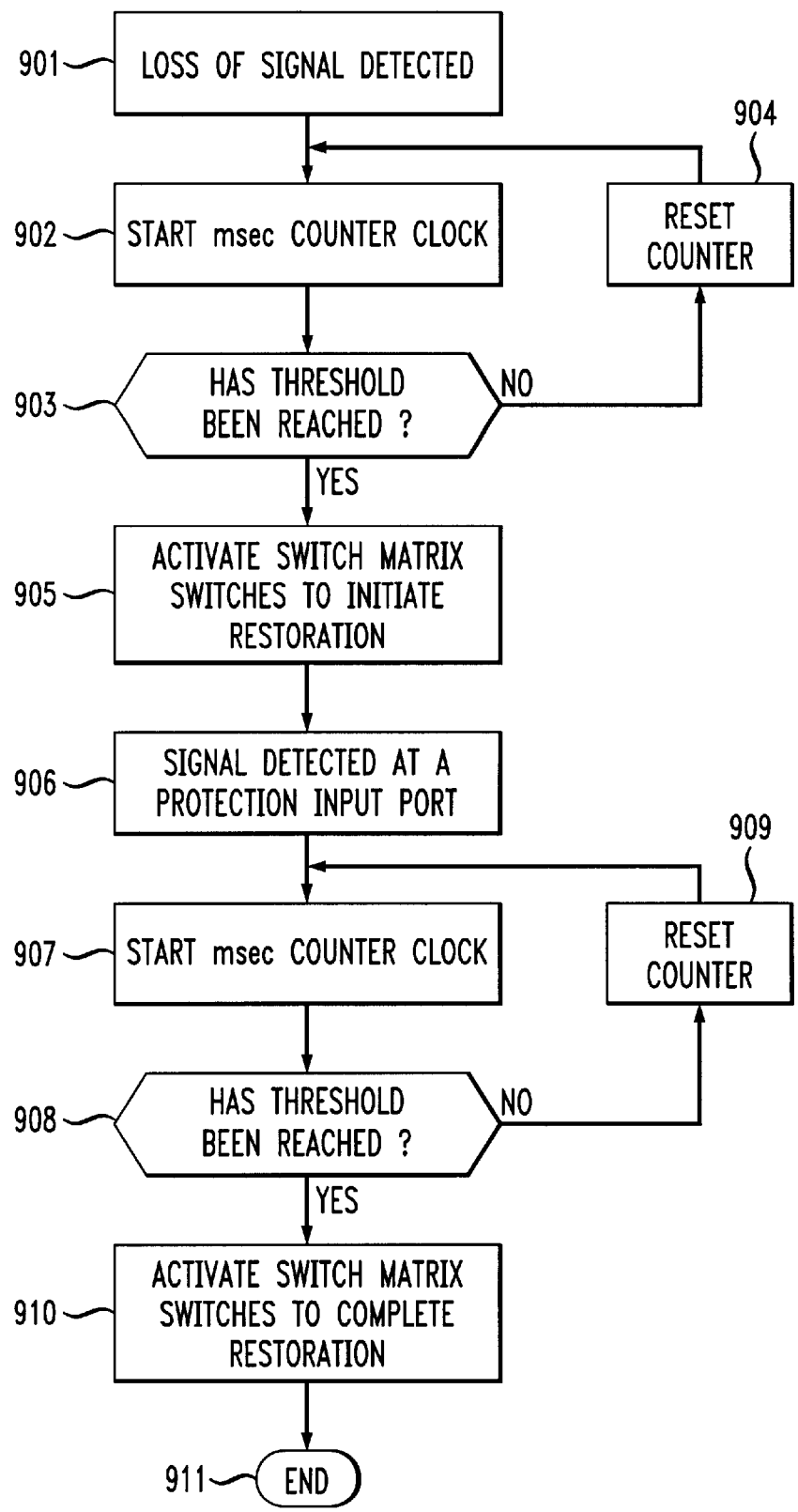
FIG. 9 is a flow chart showing the steps in effecting restoration in the optical ring transmission configuration in response to a detected loss of optical signal incoming to the node on the optical service transmission capacity.

FIG. 9 is a flow chart showing the operation of sub-controller 207 (FIG. 2) of an optical node, in response to a detected optical transmission media failure. The process is started in step 901 in response to a loss of signal indication being supplied to sub-controller 207 from optical monitor 206 (FIG. 2). Then, step 902 starts a so-called millisecond (msec) counter clock. Step 903 tests to determine if a predetermined threshold time interval has been counted in step 902. If the test result in step 903 is NO, step 904 resets the counter of step 902, and control is returned to step 902. Thereafter, steps 902, 903 and 904 are iterated unit step 903 yields a YES result and control is transferred to step 905. Step 905 causes switch control (SC) signals to be supplied to switch matrix 201 (FIG. 2) to initiate restoration from a failure indicated by the detected loss of signal. The action taken toward autonomous restoration for a failure from the east is shown in FIG. 4 and described above. Similarly, the action taken toward autonomous restoration for a failure from the west is shown in FIG. 6 and described above. Then, step 906 indicates detection of an optical signal being received at the node on an optical protection capacity input, i.e., input F and/or input G. Step 907 starts a millisecond (msec) counter clock. Step 908 tests to determine if a predetermined threshold time interval has been counted by the counter in step 907. If the test result in step 908 is NO, step 909 resets the counter in step 907 and control is transferred to step 907. Steps 907, 908 and 909 are iterated until step 908 yields a YES result and control is transferred to step 910. Step causes switch control (SC) signals to be supplied to switch matrix 201 (FIG. 2) to complete restoration in the node from a failure indicated by the detected loss of signal. The action taken toward completing the autonomous restoration for a failure from the east is shown in FIG. 6 and described above. Similarly, the action taken toward completing the autonomous restoration for a failure from the west is shown in FIG. 7 and described above. The process is ended via step 711.

Note that for pass through nodes, upon expiration of a predetermined threshold time interval of detecting the presence of an optical signal on optical protection transmission capacity input F and/or input G switch matrix 201 is controlled to effect the pass through connection on the optical protection transmission capacity as shown in FIG. 8 and described above.

Note that the threshold time intervals in steps 903 and 908 of FIG. 9 and that for the pass through nodes are to determine if the failure condition persists from some predetermined interval before switching to the restoration mode.

Figure 10:
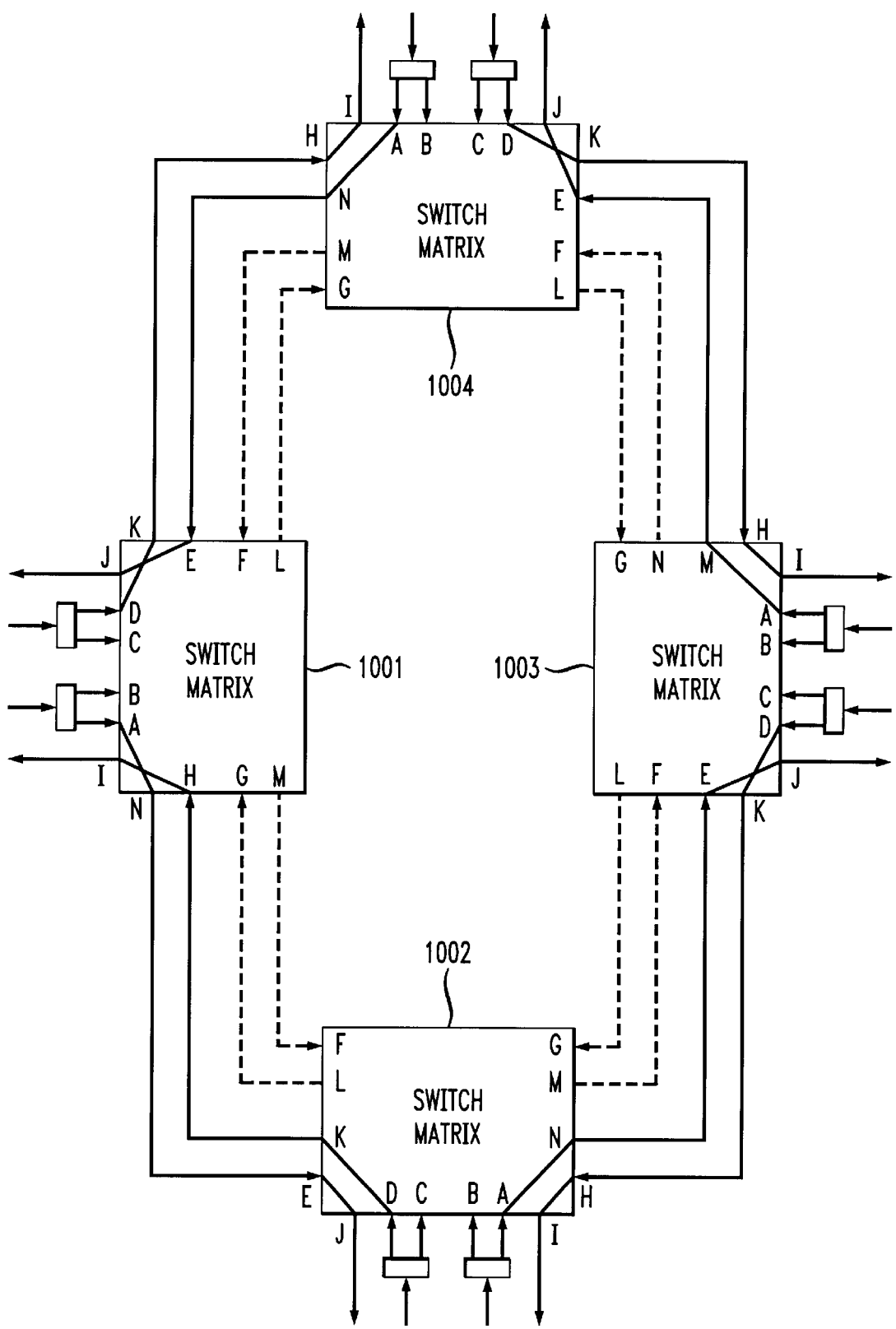
FIG. 10 shows, in simplified block form, a plurality of optical nodes connected in an optical ring transmission configuration and the optical switch matrix connections in each of the optical nodes for normal operation.

FIG. 10 shows, in simplified block form, a plurality of optical nodes, namely, 1001 through 1004, connected in a ring configuration and the optical switch matrix connections in each of the optical nodes for normal operation. The optical connections are the same as those shown in optical switch matrix 201 of FIG. 3 and are not explained again here.

Figure 11:
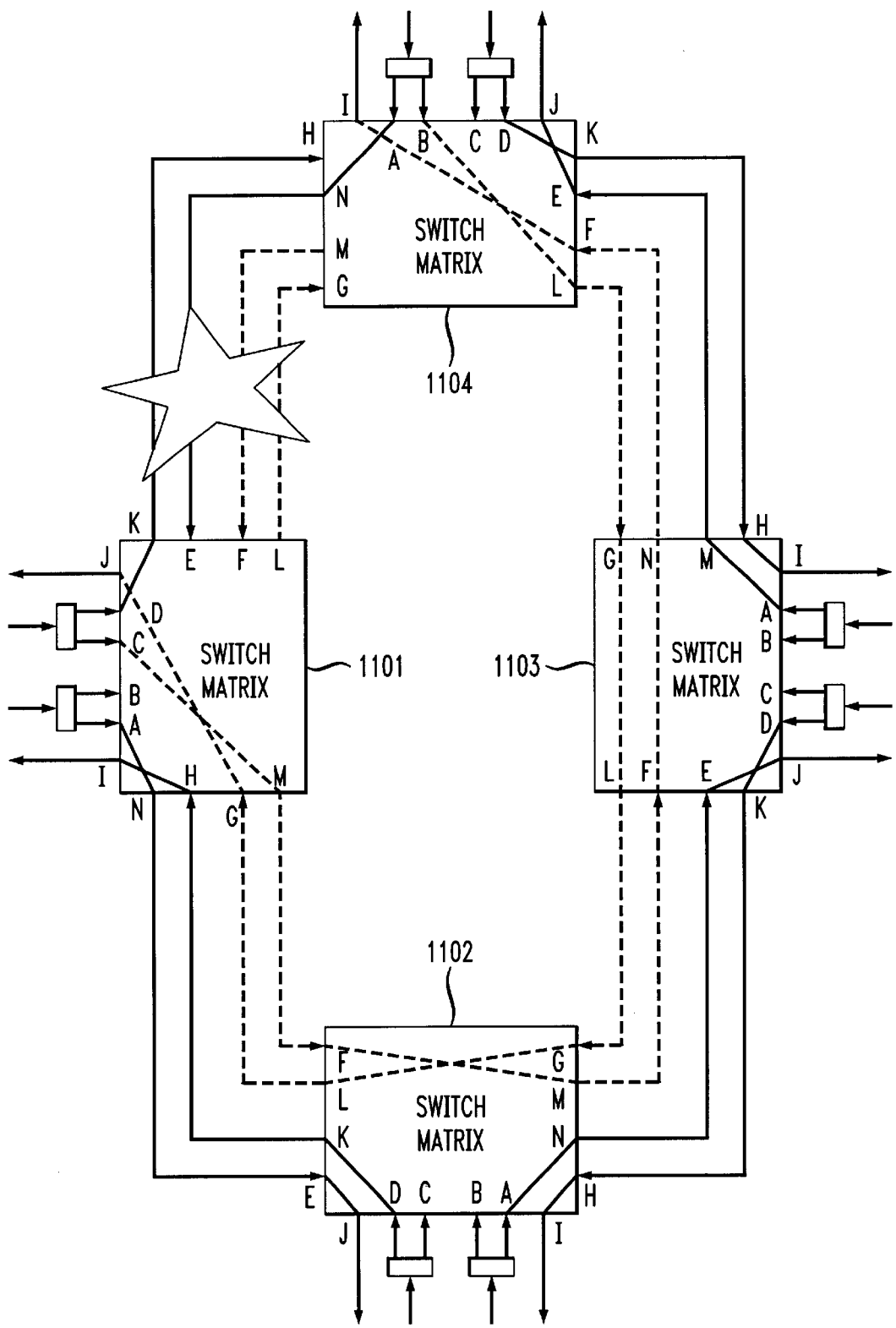
FIG. 11 shows, in simplified block form, a plurality of optical nodes connected in an optical ring transmission configuration and the optical switch matrix connections in each of the optical nodes for effecting an optical protection switch in response to a transmission media failure.

FIG. 11 shows, in simplified block form, a plurality of optical nodes, namely, 1101 through 1104, connected in an optical ring transmission configuration and the optical switch matrix connections in each of the optical nodes for effecting optical restoration, i.e., an optical protection switch, in response to a transmission media failure. As shown, the optical transmission media failure is to the east of optical node 1101 and to the west of optical node 1104. Thus optical node 1101 autonomously responds to a detected east side optical media failure, and optical node 1304 autonomously responds to a detected west side optical failure. The optical switch connections effected in optical node 1101 are identical to those shown in optical switch matrix 201 of FIG. 5 in response to an east side optical media failure, as described above in relationship to FIG. 5. The optical switch connections effected in optical node 1104 are identical to those shown in optical switch matrix 201 of FIG. 7, as described above in relationship to FIG. 7. The switch matrix 201 connections for pass through nodes 1102 and 1103 are identical to shown for switch matrix 201 shown in FIG. 8 and described above in relationship to FIG. 8.

Figure 12:
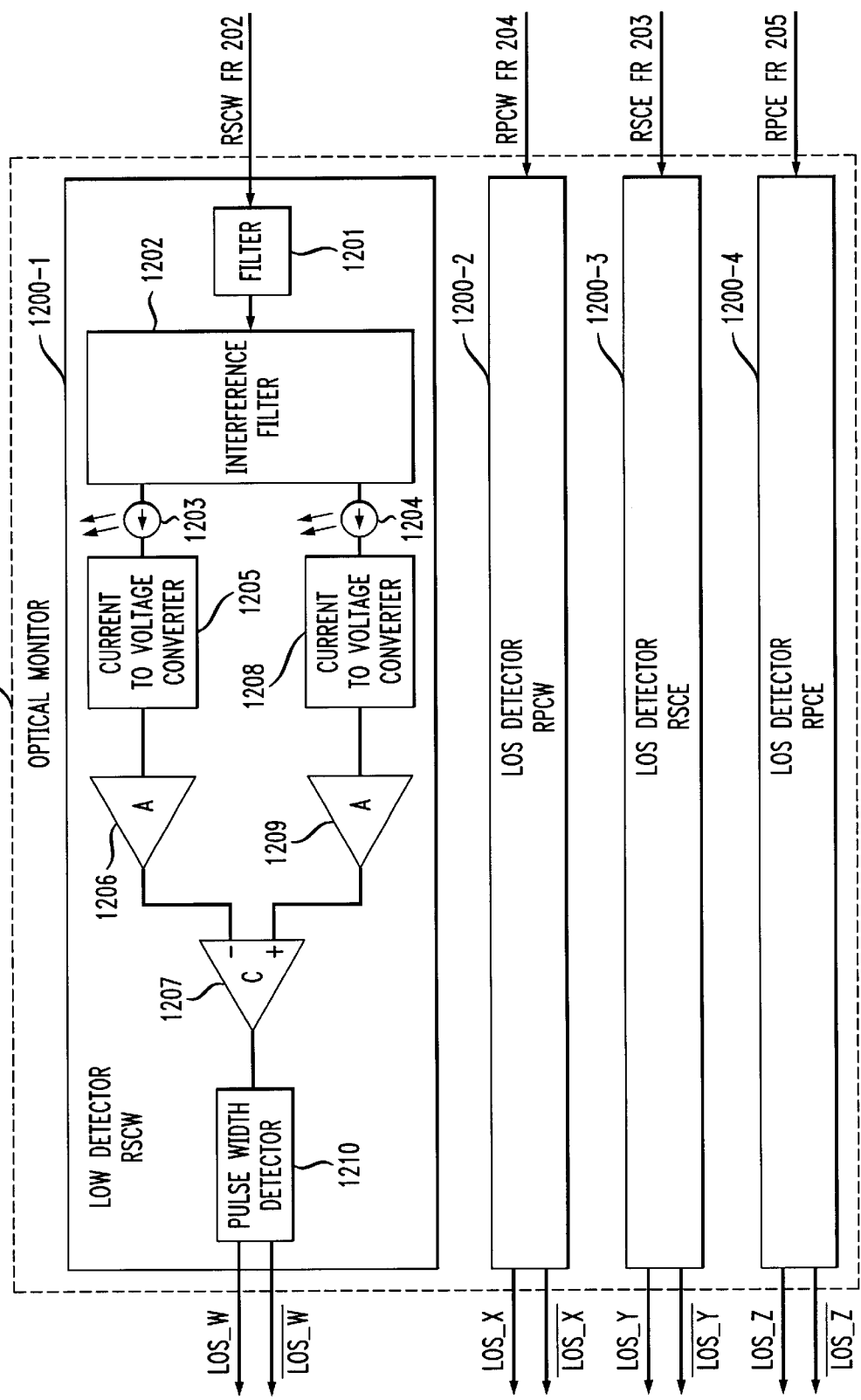
FIG. 12 shows, in simplified block diagram form, details of optical monitor 206 of FIG. 2.

FIG. 12 shows, in simplified block diagram form, details of optical monitor 206 of FIG. 2. In this example, optical monitor 206 is comprised of four (4) LOS detector units, namely, 1200-1 through 1200-4. Incoming optical signal RSCW is supplied to LOS detector RSCW 1200-1 from optical tap 202 (FIG. 2), incoming optical signal RPCW is supplied to LOS detector RPCW 1200-2 from optical tap 204, incoming optical signal RSCE is supplied to LOS detector RSCE 1200-3 from optical tap 203 and incoming optical signal RPCE is supplied to LOS detector RPCE 1200-4 from optical tap 205. Optical monitors 1200-1 through 1200-4 are all identical and, therefore, only optical monitor 1200-1 will be explained in detail. Thus, optical monitor 1200-1 includes optical filter 1201, which, in this example, is a conventional optical wavelength multiplexer that is utilized to remove the maintenance channel from incoming optical signal RSCW. The remaining optical signal of RSCW includes the communications channels, i.e., wavelengths, and is supplied to optical interference filter 1202, which, in this example, is a known optical band-pass filter. Specifically, interference filter 1202 separates a supplied optical signal into a so-called in-band optical signal and a so-called out-of-band optical signal. The in-band optical signal is comprised of, for example, optical signals having wavelengths within a predetermined range, one example being 1548 nm (nanometers) to 1562 nm (i.e., $\lambda i$) and the out-of-band optical signal is comprised of optical signals out side of the predetermined in-band range of wavelengths. Filter 1202 supplies the in-band optical signal to photodetector 1203 and the out-of-band optical signal to photodetector 1204. Photodetectors 1203 and 1204 convert the optical signals supplied thereto into electrical signals (e.g., current) in well known fashion. The current from photodetector 1203 is supplied to current-to-voltage converter 1205, which converts it to a voltage signal. One such current-to-voltage converter, which may be employed for converter 1205, in this example, is a conventional 2V/mA converter. The voltage signal is supplied from converter 1205 to amplifier 1206, which is essentially a buffer amplifier, i.e., a 1:1 amplifier. The output from amplifier 1206 is supplied to a negative input of comparator (C) 1207. The current from photodetector 1204 is supplied to current-to-voltage converter 1208, which converts it to a voltage signal. One such current-to-voltage converter, which may be employed for converter 1208, in this example, is also a conventional 2V/mA converter. The voltage signal is supplied from converter 1208 to amplifier 1209, which in this example is a 30:1 amplifier. This amplification factor of 30:1 is used to equalize the in-band signal with the out-of-band signal. This 30:1 amplification factor is employed as a threshold for determining whether a LOS has occurred. Indeed, we have recognized that when a LOS has not occurred, the in-band signal level is approximately 60 times larger than the out-of-band signal level. When a LOS has occurred the in-band signal level is approximately 40 times as large as the out-of-band signal level. The output from amplifier 1209 is supplied to a positive input of comparator (C) 1207. Comparator 1207 yields a low state, i.e., logical zero (0), output when the output from amplifier 1206 is greater than the output from amplifier 1209, i.e., the in-band signal level is greater than the amplified out-of-band signal level. Otherwise, comparator 1207 yields a high state, i.e., logical one (1), output. The output from comparator 1207 is supplied to pulse width detector 1210, which detects the duration that the output from comparator remains in a high state after a low-to-high state transition. If the duration of the high state output from pulse width detector 1210 persists for a predetermined interval, for example, for between zero (0) and 3.2 seconds, it is concluded that a LOS has occurred. Otherwise, the presence of an optical signal is indicated. When a LOS has occurred pulse width detector 1210 supplies as outputs LOS_W and $\overline{\text{LOS\_W}}$, which are supplied to sub-controller 207 (FIG. 2).

LOS detector RPCW 1200-2, LOS detector RSCE 1200-3 and LOS detector RPCE 1200-4 are essentially identical to LOS detector RSCW 1200-1 in both structure and operation. LOS detector 1200-2 supplies as outputs LOS_X and $\overline{\text{LOS\_X}}$, LOS detector 1200-3 supplies as outputs LOS_Y and $\overline{\text{LOS\_Y}}$ and LOS detector 1200-4 supplies as outputs LOS_Z and $\overline{\text{LOS\_Z}}$, all of which are supplied to sub-controller 207. Thus, LOS_Y being HIGH indicates loss of signal on input E of switch matrix 201. $\overline{\text{LOS\_Y}}$ being HIGH indicates presence of an optical signal on input E of switch matrix 201. $\overline{\text{LOS\_X}}$ being HIGH indicates no optical signal on input G of switch matrix 201. $\overline{\text{LOS\_X}}$ being HIGH indicates the presence of an optical signal on input G of switch matrix 201. LOS_W being HIGH indicates loss of signal on input H of switch matrix 201. $\overline{\text{LOS\_W}}$ being HIGH indicates presence of an optical signal on input H of switch matrix 201. LOS_Z being HIGH indicates no optical signal on input F of switch matrix 201. $\overline{\text{LOS\_Z}}$ being HIGH indicates the presence of an optical signal on input F of switch matrix 201.

Sub-controller 207 is responsive to the loss of signal and presence of signal indications from optical monitor 206 to effect the switching of the switching states of optical switch matrix 201 as described above in relationship with FIGS. 4 through 8.

It will be apparent to those skilled in the art that appropriate interface apparatus is required to interface an optical node and the optical switch matrix therein to the optical transmission media. The interface apparatus will necessarily be different to some extent depending on whether two or four optical transmission media, e.g., optical fibers, are employed.

What is claimed is:

1. An optical node for use in an optical transmission system including a plurality of optical nodes connected by at least two optical transmission media in an optical transmission ring configuration, the at least two optical transmission media providing active optical service transmission capacity and standby optical protection transmission capacity, the node comprising:

a controllable optical switch matrix having a first predetermined number of possible optical switching states and being responsive to control signals for controllably switching optical signals between the optical service capacity and optical protection capacity of said at least two optical transmission, said optical switch matrix having a plurality of optical input ports and a plurality of optical output ports, a number of said optical input ports and said optical output ports being associated with providing the active optical service transmission capacity and a number of others of said optical input ports and optical output ports being associated with providing the standby optical protection capacity;

an optical detector for detecting loss of optical signal at one of more of said optical switch matrix optical input ports associated with providing the active optical service transmission capacity and for generating an indication of such loss of optical signal, and for detecting the presence of an optical signal on said optical switch matrix input ports associated with providing the optical protection transmission capacity and for generating an indication of the presence of an optical signal on an optical input port associated with providing the optical protection transmission capacity;

a first timer responsive to said loss of signal indication for initiating timing of a first predetermined time interval;

a second timer responsive to said signal present indication for initiating timing of a second predetermined time interval; and a controller responsive to an indication of expiration of said first time interval for generating control signals to be supplied to said optical switch matrix for causing said optical switch matrix to switch switching states so that a copy of an optical signal intended to be transmitted on said active optical service transmission capacity in a direction toward the direction of the detected loss of optical signal is transmitted on said protection transmission capacity in a direction away from the direction of the detected loss of optical signal, and being responsive to an indication of expiration of said second time interval for generating control signal to cause said optical switch matrix to switch states so the said detected optical signal is supplied as an output to terminal equipment associated with the node.

2. The invention as defined in claim 1 wherein said optical detector further detects the presence of an optical signal on at least one optical input of said optical switch matrix associated with providing the optical protection transmission capacity and generates an indication of said presence of said optical signal on said optical switch matrix input associated with providing said optical protection transmission capacity, said controller generates switch control signals to cause passing though said node said detected optical signal on said optical switch matrix optical input associated with providing said optical protection transmission capacity and said controllable optical switch matrix is responsive to said generated control signals to change switching states to effect said passing through of said detected optical signal on said input associated with providing said optical protection transmission capacity.

3. The invention as defined in claim 1 wherein each of said node and said controllable optical switch matrix has an east side and a west side and wherein when a loss of optical signal is detected on an optical input on the east side, said copy of said optical signal is supplied via said controllable optical switch matrix in response to switch control signals to an output associated with said optical protection transmission capacity on the west side of said node and said optical switch matrix and wherein the presence of said optical signal on an input port associated with providing said optical protection transmission capacity is on the west side of said node and said optical switch matrix.

4. The invention as defined in claim 1 wherein each of said node and said controllable optical switch matrix has an east side and a west side and wherein when a loss of optical signal is detected on an optical input on the west side, said copy of said optical signal is supplied via said controllable optical switch matrix to an output associated with said optical protection transmission capacity on the east side of said node and said optical switch matrix and wherein the presence of said optical signal on an input port associated with providing said optical protection transmission capacity is on the east side of said node and said optical switch matrix.

5. The invention as defined in claim 1 wherein said controllable optical switch matrix in response to switch control signals disconnects said optical input on which said loss of optical signal was detected from terminal equipment in said node.

6. An optical transmission system including a plurality of optical nodes connected in a ring transmission configuration by at least two optical transmission media providing active optical service transmission capacity and standby optical protection transmission capacity, each of the optical nodes comprising:

a controllable optical switch matrix having a first predetermined number of possible optical switching states and being responsive to control signals for controllably switching optical signals between the optical service capacity and optical protection capacity of said at least two optical transmission, said optical switch matrix having a plurality of optical input ports and a plurality of optical output ports, a number of said optical input ports and said optical output ports being associated with providing the active optical service transmission capacity and a number of others of said optical input ports and optical output ports being associated with providing the standby optical protection capacity;

an optical detector for detecting loss of optical signal at one of more of said optical switch matrix optical input ports associated with providing the active optical service transmission capacity and for generating an indication of such loss of optical signal, and for detecting the presence of an optical signal on said optical switch matrix input ports associated with providing the optical protection transmission capacity and for generating an indication of the presence of an optical signal on an optical input port associated with providing the optical protection transmission capacity;

a first timer responsive to said loss of signal indication for initiating timing of a first predetermined time interval;

a second timer responsive to said signal present indication for initiating timing of a second predetermined time interval; and a controller responsive to an indication of expiration of said first time interval for generating control signals to be supplied to said optical switch matrix for causing said optical switch matrix to switch switching states so that a copy of an optical signal intended to be transmitted on said active optical service transmission capacity in a direction toward the direction of the detected loss of optical signal is transmitted on said protection transmission capacity in a direction away from the direction of the detected loss of optical signal, and being responsive to an indication of expiration of said second time interval for generating control signal to cause said optical switch matrix to switch states so the said detected optical signal is supplied as an output to terminal equipment associated with the node.

7. The invention as defined in claim 6 wherein said optical detector further detects the presence of an optical signal on at least one optical input of said optical switch matrix associated with providing the optical protection transmission capacity and generates an indication of said presence of said optical signal on said optical switch matrix input associated with providing said optical protection transmission capacity, said controller generates switch control signals to cause passing though said node said detected optical signal on said optical switch matrix optical input associated with providing said optical protection transmission capacity and said controllable optical switch matrix is responsive to said generated control signals to change switching states to effect said passing through of said detected optical signal on said input associated with providing said optical protection transmission capacity.

8. The invention as defined in claim 6 wherein each of said node and said controllable optical switch matrix has an east side and a west side and wherein when a loss of optical signal is detected on an optical input on the east side, said copy of said optical signal is supplied via said controllable optical switch matrix in response to switch control signals to an output associated with said optical protection transmission capacity on the west side of said node and said optical switch matrix and wherein the presence of said optical signal on an input port associated with providing said optical protection transmission capacity is on the west side of said node and said optical switch matrix.

9. The invention as defined in claim 6 wherein each of said node and said controllable optical switch matrix has an east side and a west side and wherein when a loss of optical signal is detected on an optical input on the west side, said copy of said optical signal is supplied via said controllable optical switch matrix to an output associated with said optical protection transmission capacity on the east side of said node and said optical switch matrix and wherein the presence of said optical signal on an input port associated with providing said optical protection transmission capacity is on the east side of said node and said optical switch matrix.

10. The invention as defined in claim 6 wherein said controllable optical switch matrix in response to switch control signals disconnects said optical input on which said loss of optical signal was detected from terminal equipment in said node.

* * * * *